Figure 1:
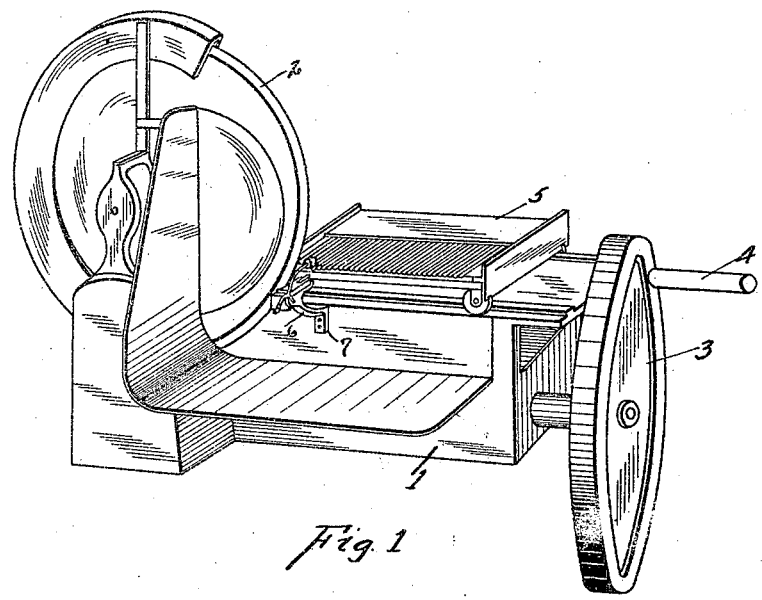

T. C. SCHIRNER.
RIND STRIPPING DEVICE.
APPLICATION FILED JAN. 10, 1912.

1,043,257.

Patented Nov. 5, 1912.

Witnesses
W. H. Bock
A. L. Phelps

Inventor
Theodore C. Schirner

By
C. C. Shepherd Attorney

UNITED STATES PATENT OFFICE.

THEODORE C. SCHIRNER, OF COLUMBUS, OHIO.

RIND-STRIPPING DEVICE.

1,043,257.   Specification of Letters Patent.   Patented Nov. 5, 1912.

Application filed January 10, 1912. Serial No. 670,450.

*To all whom it may concern:*

Be it known that I, THEODORE C. SCHIRNER, a citizen of the United States, residing at Columbus, in the county of Franklin and State of Ohio, have invented certain new and useful Improvements in Rind-Stripping Devices, of which the following is a specification.

My invention relates to a rind stripping device and is particularly directed to the provision of a means for stripping the rind from bacon and other similar articles and in the course of such stripping operation to provide a means for insuring stripping of the rind by the obviation of accidental misdirection of the stripping element occasioned by various existing conditions, one of which is the uneven and irregular shape of the article from which the rind is being stripped.

More explicitly, my invention resides in the provision of a rind stripping device of such a nature that the article presented thereto is caused to pass in a definite and predetermined plane to such stripping element. For instance, in the stripping of the rind from bacon, rind strippers have been practically abandoned owing to the fact that different pieces of bacon have irregularities in shape and form which practically render it impossible to insure removal of the rind throughout the piece.

My invention contemplates a structure which entirely obviates this drawback and insures the movement and presentation of the bacon to the stripping element in a definite and ascertained plane, and in the effectuation of this result, I desirably utilize a clamping run-way structure of a preferably resilient nature, thus made resilient to automatically permit of entry to the run-way formed as well as of subsequent passage through such run-way, with the greatest possible ease commensurate with an accurate cutting action.

One of the adaptations of my invention comprises the application of my rind trimming device to a meat slicing machine having a movable bed and desirably having the rind trimming device disposed directly forward of the cutting blade. In this form of my invention, there is provided a rind trimming device regulable as to vertical and lateral movement and supplemented by a compressing arm or finger having a roller carried thereon for forcing the bacon into a comparatively flat position upon the bed as it approaches the trimmer. In this form, the compression device is resiliently maintained upon the upper surface of the bacon. Its application to a meat slicing machine having a movable bed, is shown in the accompanying drawings, in which similar characters of reference designate corresponding parts, and in which—

Figures 2, 3, 4:
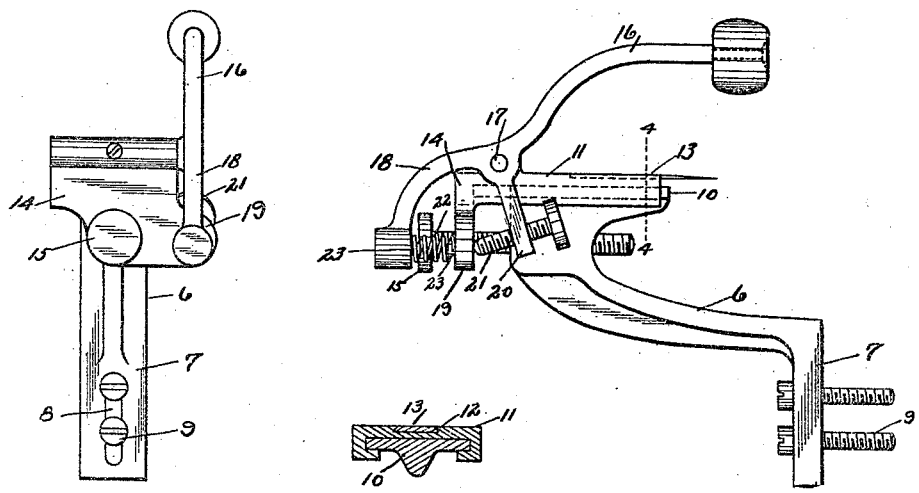

Figure 1 is a perspective view of a meat cutting machine my invention applied thereto, Fig. 2 is a side elevation of my rind trimming device detached, Fig. 3 is a rear elevation of the structure shown in Fig. 2, and, Fig. 4 is a sectional view taken on line 4—4 of Fig. 2.

In the drawings, the meat slicing machine is shown as comprising a body 1, a rotatable cutter blade 2, a driving wheel 3 having a handle 4 thereon, and a reciprocating bed 5 upon which the bacon is adapted to be clamped and which is constructed to feed the bacon to the slicing blade 2 as the slices are cut therefrom.

The rind trimmer is shown as comprising a bracket 6 having its attaching extension 7 slotted as at 8 for the reception of screws or bolts 9, such slot serving to permit vertical adjustment of the bracket. The upper end of the bracket 10 is of substantially T-form and of a shape to provide a base for the slidable mounting of a knife carriage 11. This knife carriage 11 is provided at its forward end and upon its upper surface with a dove-tailed recess 12 for the reception of a complementally shaped knife blade 13, which may be removed therefrom at will. The rear end of the said knife carriage 11 is formed with an angularly disposed extension 14 having a threaded aperture therein for the reception of an adjusting screw bolt 15 which is threaded into the bracket 6 at its inner end and which permits of a positive lateral movement of the blade carriage with respect to the traveling bed.

Desirably mounted upon the blade carriage 11, is a finger 16 pivoted at 17 and having a rearwardly and downwardly extending piece 18 which extends to a point in the rear of a lateral extension 19 of the extension 14. At the point of pivoting of the finger 16, there is formed a downwardly depending element 20 carrying an adjusting screw 21 which normally bears against the lateral extension 19 and limits the downward movement of the finger. However, the finger 16 is normally pressed downwardly toward the bacon carried upon the traveling bed, by a spring or other resilient element 22 which, in the present case, is in the nature of a compression spring interposed between the piece 18 and the lateral extension 19, a socket or centering means being provided therefor to insure the holding of such spring in place. This centering means is shown in the present case by lugs 23.

From the above explanation, it will be seen that I have provided a rind trimming device which insures the movement of the article being trimmed in a definite and settled plane during its presentation to the trimming knife. In addition, it will be observed that the compression finger utilized by me in the production of this result, is normally maintained in operative position by a resilient element and yet such compression finger is further controlled by an adjusting screw, which limits the downward movement of the finger under the tension of the resilient element. In addition, there is provided a positive means for adjusting the knife carriage longitudinally upon its bed in either direction, which is an adjustment of the knife blade laterally with respect to the reciprocating bed and that such adjustment may be controlled in either direction by a positive regulation of the adjusting screw. Furthermore, I have provided a readily attachable blade which is nevertheless held in place without any fastening medium, because of its peculiar formation and the complementally peculiar formation of its socket.

What I claim, is—

1. In combination with a slicing machine for successively removing strips of material, an attachment comprising means for severing the rind from the strip being sliced just prior to each slicing action, and means coöperatively mounted with respect to said severing means for maintaining the edge of the material being operated upon in definite relation to the said severing means.

2. In combination with a slicing machine for successively removing strips of material, an attachment comprising means for severing the rind from the strip being sliced just prior to each slicing action, and pressure means coöperatively mounted with respect to said severing means for maintaining the edge of the material being operated upon in definite relation to the said severing means.

3. In combination with a slicing machine for successively removing strips of material, an attachment comprising means for severing the rind from the strip being sliced just prior to each slicing action, and means automatically effective upon presentation of the material to the said severing means to maintain the edge of the said material being operated upon in definite relation to the said severing means.

4. In combination with a slicing machine for successively removing strips of material, an attachment comprising means for severing the rind from the strip being sliced just prior to each slicing action, and resilient means for maintaining the edge of the material being operated upon in definite relation to the said severing means.

5. In combination with a slicing machine for successively removing strips of material, an attachment comprising means for severing the rind from the strip being sliced just prior to each slicing action, and regulable means coöperatively mounted with respect to said severing means for maintaining the edge of the material being operated upon in definite relation to said severing means.

6. In combination with a slicing machine for successively removing strips of material, an attachment comprising means for severing the rind from the strip being sliced just prior to each slicing action, and removable means coöperatively mounted with respect to said severing means for maintaining the edge of the material being operated upon in definite relation to the said severing means.

7. In combination with a slicing machine for successively removing strips of material, an attachment comprising means for severing the rind from the strip being sliced just prior to each slicing action, means for regulating the depth of each severing action, and means coöperatively mounted with respect to said severing means for maintaining the edge of the material being operated upon in definite relation to said severing means.

8. In combination with a slicing machine for successively removing strips of material, an attachment comprising means for severing the rind from the strip being sliced just prior to each slicing action, means for vertically adjusting said severing means, and means coöperatively mounted with respect to said severing means for maintaining the edge of material being operated upon in definite relation to said severing means.

9. In combination with a slicing machine for successively removing strips of material, an attachment comprising means for severing the rind from the strip being sliced just prior to each slicing action, means for vertically adjusting said severing means, means for regulating the depth of each severing action, and means coöperatively mounted with respect to said severing means for maintaining the edge of the material being operated upon in definite relation to said severing means.

10. In combination with a slicing machine for successively removing strips of material, an attachment comprising means for severing the rind from the strip being sliced just prior to each slicing action, means for regulating the depth of each severing action, and regulable means coöperatively mounted with respect to said severing means for maintaining the edge of the material being operated upon in definite relation to the said severing means.

11. In combination with a slicing machine for successively removing strips of material, an attachment comprising means for severing the rind from the strip being sliced just prior to each slicing action, and a roller coöperatively mounted with respect to said severing means for maintaining the edge of the material being operated upon in definite relation to the said severing means.

12. In combination with a slicing machine for successively removing strips of material, an attachment comprising means for severing the rind from the strip being sliced just prior to each slicing action, and an automatically effective roller coöperatively mounted with respect to said severing means for maintaining the edge of the material being operated upon in definite relation to the said severing means.

13. In combination with a slicing machine for successively removing strips of material, an attachment comprising means for severing the rind from the strip being sliced just prior to each slicing action, means coöperatively mounted with respect to said severing means for maintaining the edge of the material being operated upon in definite relation to the said severing means, and means for rendering said last means and said severing means ineffective.

14. In combination with a slicing machine for successively removing strips of material, an attachment comprising means for severing the rind from the strip being sliced just prior to each slicing action, a roller coöperatively mounted with respect to said severing means for maintaining the edge of the material being operated upon in definite relation to said severing means, and means for rendering said roller and said severing means ineffective.

15. In combination with a slicing machine for successively removing strips of material, an attachment comprising means for severing the rind from the strip being sliced just prior to each slicing action, a resilient held roller coöperatively mounted with respect to said severing means for maintaining the edge of the material being operated upon in definite relation to said severing means.

16. In combination with a slicing machine for successively removing strips of material, an attachment comprising means for severing the rind from the strip being sliced just prior to each slicing action, a resilient held roller coöperatively mounted with respect to said severing means for maintaining the edge of the material being operated upon in definite relation to said severing means, and means for rendering the said roller and said severing means ineffective.

In testimony whereof I affix my signature in presence of two witnesses.

THEODORE C. SCHIRNER.

Witnesses:
   WALTER E. L. BOCK,
   A. L. PHELPS.